J. R. CARTER.

Assignor, by mesne assignments, to CARTER & COMPANY, (Limited.)

MACHINE FOR NUMBERING PAPER.

No. 11,091. Reissued June 24, 1890.

WITNESSES:

C. L. Bendixon

J. J. Laass.

INVENTOR

John R. Carter

BY

Dull, Laass & Dull

ATTORNEYS

THE NORRIS PETERS CO., PHOTO-LITHO., WASHINGTON, D. C.

J. R. CARTER.

Assignor, by mesne assignments, to CARTER & COMPANY, (Limited.)

MACHINE FOR NUMBERING PAPER.

No. 11,091. Reissued June 24, 1890.

WITNESSES:

C. L. Bendixon

J. J. Saasz.

INVENTOR:

John R. Carter

BY

Dull, Laass & Dull

ATTORNEYS

THE NORRIS PETERS CO., PHOTO-LITHO., WASHINGTON, D. C.

UNITED STATES PATENT OFFICE.

JOHN ROBERT CARTER, OF LOS ANGELES, CALIFORNIA, ASSIGNOR, BY MESNE ASSIGNMENTS, TO CARTER & COMPANY, (LIMITED,) OF NIAGARA FALLS, NEW YORK.

MACHINE FOR NUMBERING PAPER.

SPECIFICATION forming part of Reissued Letters Patent No. 11,091, dated June 24, 1890.

Original No. 409,920, dated August 27, 1889. Application for reissue filed January 22, 1890. Serial No. 337,889. Patented in England June 8, 1886, No. 7,699, and in Canada February 14, 1890, No. 33,716.

*To all whom it may concern:*

Be it known that I, JOHN ROBERT CARTER, a subject of the Queen of Great Britain, formerly a resident of Toronto, Canada, and now a resident of Los Angeles, in the county of Los Angeles, State of California, have invented certain new and useful Improvements in Machines for Numbering Paper, (for which I have obtained a patent in Great Britain, No. 7,699, bearing date June 8, 1886, and a patent in Canada, No. 33,716, dated February 14, 1890,) of which the following is a specification.

The object of the invention is to devise mechanism by which numerals or other signs may be printed on paper on both sides during the passage of the web or sheet of paper through the machine; and it consists, essentially, of two sets of stationary platens having their faces in substantially the same plane and facing in opposite directions, and two sets of intermittently-changing printing-types provided with mechanism by which the two sets of types shall derive a reciprocating action, so as to bring each set of type against its respective platen, substantially in the manner hereinafter more particularly explained.

Figure 1:
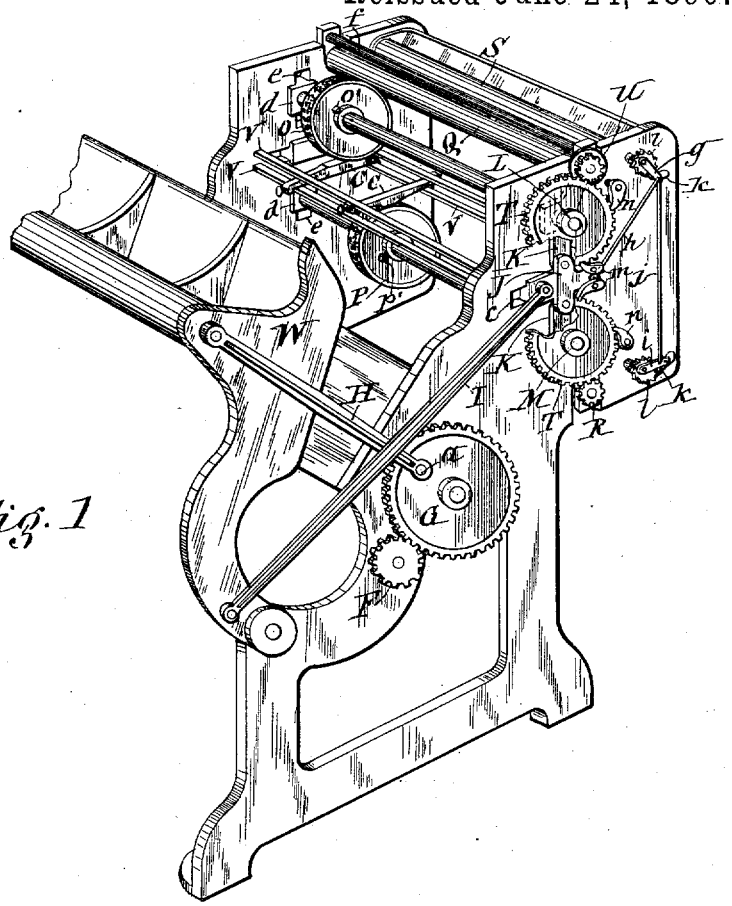
Figure 3:
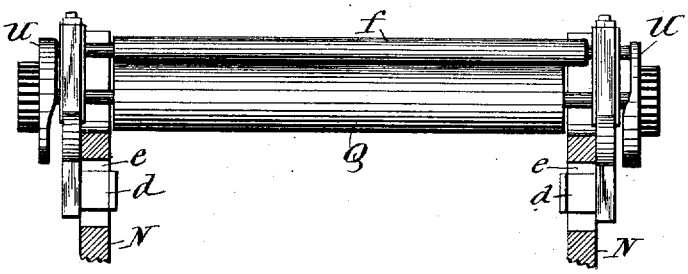
Figure 2:
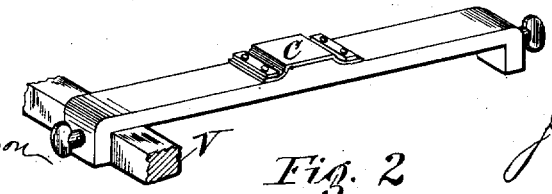
Figure 4:
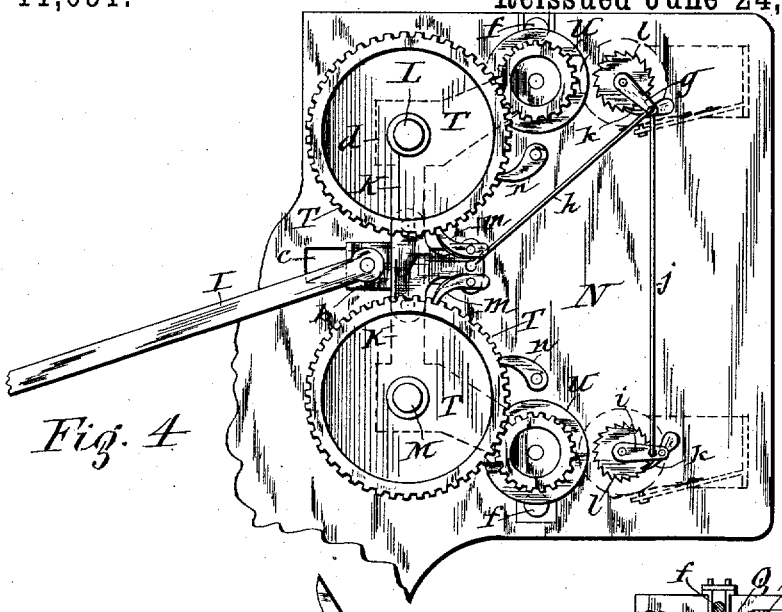
Figure 5:
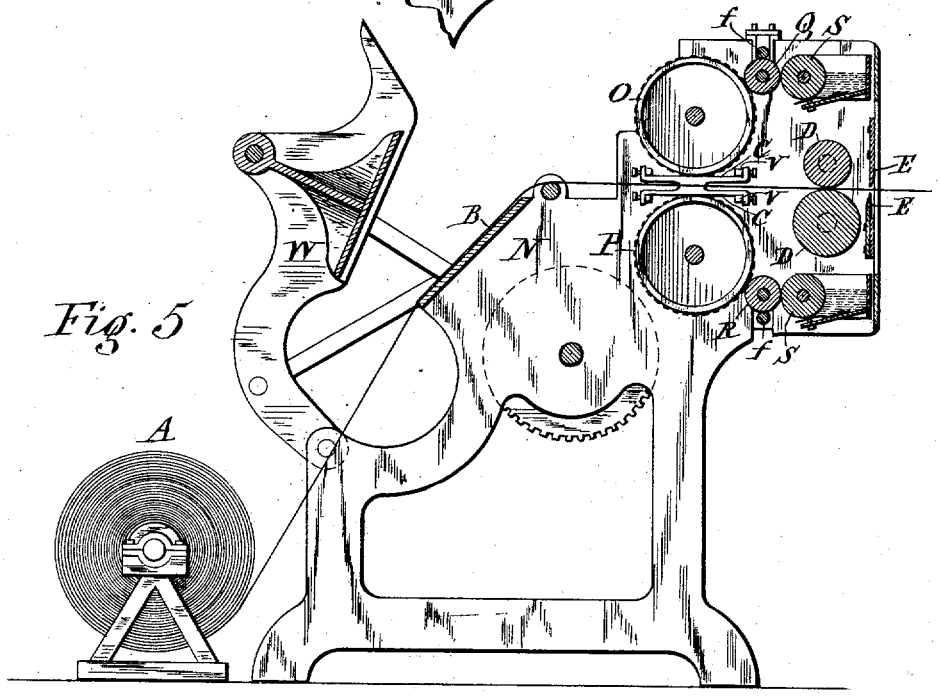

Figure 1 is a perspective view showing the principal parts of the mechanism involved in my invention. Fig. 2 is a perspective detail of one of the stationary platens. Fig. 3 is a detail of my inking-rollers. Fig. 4 is an enlarged detail showing the mechanism for operating the type and inking-rollers. Fig. 5 is a sectional elevation of the machine.

A represents a roll of paper from which the paper to be printed and numbered is drawn. I show this roll in Fig. 5 only, on reference to which figure it will be seen that the paper first passes over the printing-platen B, then between the platens C, between the feeding-rollers D, and then between the knives E, which cut off the paper the required length; but as they are not involved in my present invention it is not necessary to describe them in this specification.

In the present case the platens are stationary and the type-wheels reciprocate. This arrangement of the stationary platens and moving type-wheels has a particular advantage over the reverse arrangement shown in my previous patent, No. 329,715. In operating the machine shown in said patent this difficulty was encountered: If the acting faces of the type-cylinders were on the same plane, the paper as it was fed between the cylinders came in contact with the figures on their faces, and thus the paper was smeared. If, on the contrary, the faces of the platens were set on the same line, so that the paper as it was fed through did not come in contact with the cylinders until it was pressed thereon by the platens, then when said platens were pressed upon the cylinders the paper was necessarily pressed out of a straight line, and this caused a blurred impression of the figures on the paper. By my present invention this is overcome, as, the faces of the platens being in line, the paper is drawn through between them without the possibility of being soiled by contact with the type on the cylinders, as the platens serve to keep the paper away from the type on the cylinders, as will plainly be seen on reference to Fig. 5. When the printing is performed, the paper is held in a perfectly straight line, and is not moved either by the printing-cylinders or platens, and thus the printing is not "blurred," and smooth sharp figures are the result.

F is the main driving-pinion, which derives motion from any convenient source and from which all the rest of the mechanism in the machine is driven. This pinion F meshes with the spur-wheel G, upon which the crank-pin *a* is fixed.

H is a pitman connected at one end to the crank-pin *a* and at its other end to a pin on the press-head W, which is hinged to the frame so as to allow said press-head to oscillate to and from the platen B.

A pitman I connects the press-head W to the coupling-link J, which is pivoted upon and connects the two bars K, loosely journaled at their other ends upon the spindles L and M. The coupling-link J is provided with a suitable guide-piece *b*, which fits into the horizontal slot *c*, made in the frame N. The spindles L and M are carried in suitable bearing-boxes *d*, fitted into vertical slots *e*, made in the frame N, as shown in Figs. 1 and 3 of the drawings, said slots being of sufficient length to allow the boxes to slide vertically therein.

I am only referring to the mechanism on one side of the machine; but it will be understood, as indicated by Fig. 1, that the mechanism herein referred to is duplicated on the opposite side of the machine.

O and P are type-rollers fixed, respectively, to the spindles L and M.

The surface of the platen C opposite to the type-roller O is on the same plane as the surface of the platen C opposite to the type-roller P, so that the entire surface of the paper A passing between the said platens, as indicated in Fig. 5, is on the same plane.

Q is a composition roller for inking the type on the roller O, and R is a roller for inking the type on the roller P. Each of these inking-rollers Q and R is provided with a suitable ink-distributing roller *f*, which derives motion from contact with its respective inking-roller.

S are metal fountain or doctor rollers, each revolving in its respective ink-fount, as indicated, and held in contact with its respective inking-roller Q or R. An arm *g* is loosely journaled on the spindle of the upper fountain or doctor roller S. A rod *h* connects said arm to the coupling-link J, and another rod *j* connects the same arm to an arm *i*, which is journaled on the spindle of the lower roller S. To each of the spindles of the doctor-rollers S S is fastened a ratchet-wheel *l*, and to each of the arms *g* and *i* is pivoted a dog *k*, arranged to engage the adjacent ratchet-wheel.

*m* are ratchet-dogs pivoted on the coupling-link J and arranged to engage with the teeth in the spur-wheels T, which are secured one to each of the spindles L and M.

From this general description and the construction of the parts specified it will be understood that when the driving-pinion F revolves and the paper is drawn from the roll A by the action of the feed-rollers D, which are not necessary to describe here, the paper will be printed at B, and simultaneously with this the coupling-link J will be pushed lengthwise in the slot *c* and caused to draw the type-rollers P and P against the paper on their respective platens C C by means of the bars K K, and while the coupling-link J is thus moving it pushes the rod *h*, so as to move the arm *g*, and through it and the rod *j* the dogs *k* sufficiently far to enable them to grasp a tooth in their respective ratchet-wheels *l*. The dogs *m* are at the same time moved so as to engage with anothor tooth in their respective spur-wheels T. As the driving-pinion F continues to revolve, the coupling-link J is brought back into its initial position, and in thus moving the rollers S and spur-wheels T are caused to revolve by the action of their respective ratchet-dogs, and as the type-rollers O and P are connected to the same spindles as the spur-wheels T they will likewise revolve, so as to bring a fresh number opposite to their respective platens.

It will be understood that the inking-rollers herein referred to are caused to revolve, and the distributing-roller will also revolve, so long as the driving-pinion F is in motion.

In order to impart a reciprocating longitudinal motion to the distributing-rollers *f*, I attach on the spindles of the rollers Q and R cams U. (See Fig. 3.) These cams are shaped, substantially as shown, so that as the rollers Q and R revolve their respective distributing-rollers *f* are moved longitudinally by the action of the said cams, as will be understood on reference to Fig. 3 referred to.

It will be noticed that the platens C are, as indicated by Fig. 2, adjustably connected to the bars V, so that they may be readily moved across the machine, so as to bring them opposite to their respective rollers O and P, which, I may mention, are likewise adjustably connected to their spindles in any convenient manner—for instance, by means of set-screws *o′ p′*, as shown in Fig. 1. This enables the numbers to be imprinted in any desired position on the paper.

It will also be noticed that I pivot on the frame N of the machine the dogs *n*, designed to engage with the spur-wheels T, so as to prevent the said spur-wheels from revolving backward during the time that the dogs *m* are moved to obtain a new hold on the said spur-wheels.

What I claim as my invention is—

1. In a machine for printing paper on both sides, the combination of a plurality of platens secured stationary in their respective positions and disposed with their faces in line with the travel of the paper and at opposite sides thereof, a plurality of intermittently-changing printing-types, each adapted to move to and from its respective platen, and mechanisms arranged to impart reciprocating motion to the two sets of type and to automatically change the types, as set forth.

2. Two sets of stationary platens having their faces in substantially the same plane and facing in opposite directions, and two sets of intermittently-changing printing-types, in combination with mechanism arranged to impart a reciprocating action to the two sets of types, so as to bring each set of type against its respective platen, substantially as and for the purpose hereinbefore described.

3. The combination of two sets of intermittently-changing printing-types supported in reciprocating bearings, two sets of stationary platens having their faces in substantially the same plane and facing in opposite directions, and mechanism arranged to impart a reciprocating motion to the two sets of type in opposite directions to bring each set of type against its respective platen, substantially as and for the purpose specified.

4. The pitman I, connected at one end to the pivoted printing-head, which derives a rocking movement through the pitman H from the revolving spur-wheel G, and at its other end to the coupling-link J, in combination with the spindles L and M, and the type-rollers carried thereby, and the bars K, arranged to connect the spindles L and M to the coupling-link J, substantially as and for the purpose specified.

5. The coupling-link J, provided with guide-pieces *b*, which fit into their respective slots *c*, made in the frame N, and the bars K, connecting the spindles L and M to the coupling-link J, in combination with the spindles L M, type-rollers O P, and the bearing-boxes *d*, supporting the spindles L and M and fitting into the vertical slots *e*, arranged substantially as and for the purpose specified.

6. The combination, with the press-head W, coupling-link J, and pitman I, connecting said head and link, of the spur-wheels T, dogs *m* on said link and arranged to engage with said spur-wheels, the upper roller S, and connections between said roller and the coupling-link, whereby the spur-wheels T and roller S are rotated simultaneously, as set forth.

7. The combination, with the press-head W, coupling-link J, pitman I, connecting said head and link, the spur-wheels T, and the dogs *m*, pivoted on said link and arranged to engage said spur-wheels, of the upper and lower rollers S, and connections between said rollers and between said upper roller and the link J, whereby said spur-wheels and rollers are all operated simultaneously, as set forth.

8. The coupling-link J, spur-wheels T, and dogs *m*, pivoted on the coupling-link J and arranged to engage with the spur-wheels T, as specified, in combination with the rollers Q and R, intermittently-changing printing-type wheels, the upper roller S, the rod *h*, connected at one end to the coupling-link J and at its other end to the arm *g*, which is loosely journaled upon the spindle of the upper roller S, the dog *k*, pivoted on the arm *g* and arranged to engage with the ratchet-wheel *l*, secured to the spindle of the said roller S, and means for reciprocating said link at stated intervals.

9. The dogs *m*, pivoted on the coupling-link J and arranged to engage with the spur-wheels T, as specified, the rod *h*, connected at one end to the coupling-link J and at its other end to the arm *g*, which is loosely journaled upon the spindle of the upper roller S, and the dog *k*, pivoted on the arm *g* and arranged to engage with the ratchet-wheel *l*, secured to the spindle of the said roller S, in combination with the rollers Q and R, intermittently-changing printing-type wheels, the upper and lower rollers S, the rod J, connected at its upper end to the arm *g* and at its lower end to the arm *i*, which is loosely journaled on the spindle of the lower roller S and has a dog *k* pivoted on it and arranged to engage with the ratchet-wheel *l*, secured to the spindle of the lower roller S, and means for reciprocating said link J at stated intervals, substantially as and for the purpose specified.

10. The platens C, adjustably connected upon bars secured to the frame of the machine, so that the faces of the platens shall face in the opposite direction, but will be in substantially the same plane, in combination with the type-rollers O and P, adjustably connected to their spindles, which derive a reciprocating action, so as to bring the faces of the type-rollers simultaneously against their respective platens.

JOHN ROBERT CARTER. [L. S.]

Witnesses:

W. CARYL ELY,

FRANCIS J. THOMAS.